Dec. 15, 1964 S. B. McLELLAN 3,161,090
STUD ENGAGING WRENCH HAVING A FLUTED GRIPPING SURFACE
Filed Oct. 17, 1962
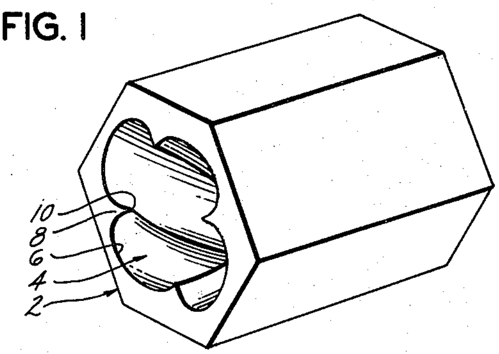
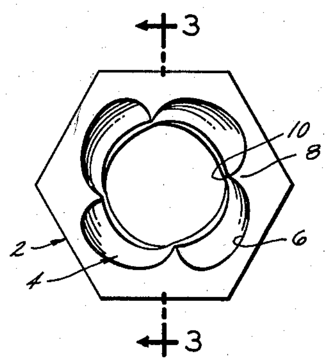
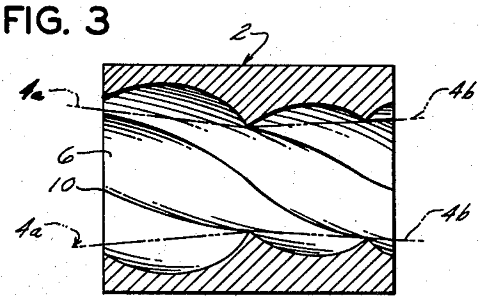
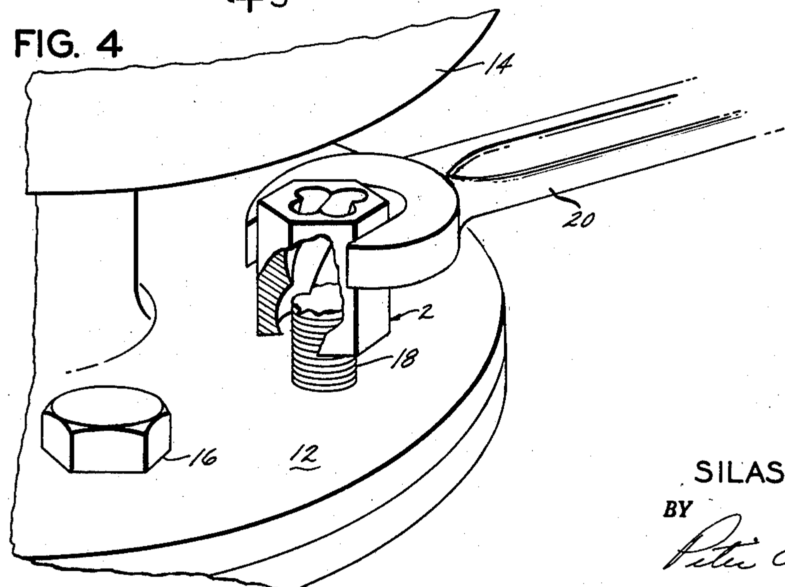
INVENTOR.
SILAS B McLELLAN
BY
Peter L. Costas
ATTORNEY 3,161,090

STUD ENGAGING WRENCH HAVING A FLUTED GRIPPING SURFACE

Silas B. McLellan, 36 W. Main St., Plymouth, Conn.

Filed Oct. 17, 1962, Ser. No. 231,163
6 Claims. (Cl. 81—53)

The present invention relates to devices for applying torque to a rotatable member of a connection such as threaded fastenings to effect engagement of disengagement thereof.

It is the aim of the present invention to provide a simple and highly effective device for applying torque to a rotatable member of a connection which has a peripheral configuration with which it is difficult to effect firm engagement such as a bolt having a broken head or a round nut, and which is relatively economical to manufacture.

A related aim is to provide such a torque applying device which can be utilized readily in difficultly accessible locations by coupling with generally available tools to impart a large torque to the member of a connection.

A specific aim is to provide such a torque applying device which is positive and highly effective in its gripping action and which is capable of use with bolts or other connecting members of a range of widths.

Other objects and advantages will be apparent from the following detailed description and claims and the attached drawing wherein:

FIGURE 1 is a perspective view of a torque applying device embodying the present invention;

FIGURE 2 is a plan view of the device of FIGURE 1;

FIGURE 3 is a cross-sectional view of the device along the line 3—3 of FIGURE 2 and showing the diameter of the bore in phantom; and FIGURE 4 is a perspective view of the device as being used upon a broken bolt of a machine and with a portion thereof broken away to reveal internal detail.

It has now been found that the foregoing and related aims can be readily attained by a torque applying device comprised of a block having a transverse section of polygonal configuration with an axial bore therein having a portion of generally conical or frusto-conical configuration tapering inwardly to a reduced diameter. The block has a plurality of helical flutes of high pitch in the surface thereof in closely spaced relationship in the periphery of the bore which provide helically extending blade portions therebetween having relatively sharp blade edges which will bite into the metal of a threaded fastener or the like received in the bore and which will cause the device to be drawn tightly onto the fastener during application of torque thereto.

The flutes with their curvilinear cross section provide blade portions therebetween with side edges which are concave in section and taper to a relatively sharp blade edge at their intersection. In the preferred aspect of the invention, the block is prismatic and has a bore which extends axially therethrough and has one outer end portion of greater diameter than the other end, the bore tapering inwardly from both ends to an intermediate section of minimum diameter. This double-tapered bore construction enables the use of a single device with a wider range of fastener diameters.

Although a single blade edge provided by a pair of flutes will provide beneficial gripping action, generally it is desirable to divide the periphery of the bore into three to eight flutes having substantially equal chords so as to obtain more biting edges about the periphery of the fastener. However, since the blade edges of the present invention bite as effectively, use of more than eight flutes may result in shearing of the metal of the fastener therebetween, particularly in fasteners of smaller diameter.

The preferred range of flutes and blade edges is four to six, and four flutes and edges have been found to provide optimum effectiveness in both bite and initial grip as well as low tendency towards slippage on or shearing of the fastener.

When the device is applied for the removal of threaded fasteners such as bolts having broken or rounded heads, the direction of the helix defined by the flutes should cooperate with the direction of the threads of the fastener so as to be opposite thereto. In this fashion, the initial torque applied to loosen the fastener will cause the device to seat tightly onto the fastener until the blade portions lodge firmly into the metal of the fastener so that relative rotation therebetween will no longer occur during further application of torque. Thus, a wrench or similar tool engaged upon the periphery of the device can be used to transmit a great amount of torque to the fastener to effect disengagement even though it may be rusted or painted.

Referring in detail to the attached drawing, therein illustrated is a device embodying the present invention which comprises the elongated polygonal or prismatic block 2 having a bore extending therethrough designated generally by the numeral 4. As shown by the dotted lines in FIGURE 3, the bore 4 is comprised of a pair of generally conical portions *4a*, *4b* which taper inwardly from the outer ends to an intermediate section of reduced diameter.

About the periphery of the bore 4, the periphery of the surface of the block 2 is divided by four helical flutes 6 of high pitch. The flutes 6 are of generally curvilinear cross section with substantially equal chords and are closely spaced immediately adjacent each other so that the arcs of adjacent flutes intersect. Between the several flutes 6 are four helical blade portions 8 having concave side faces defined by the curvilinear flutes and tapering to relatively sharp blade edges 10 at their intersections which similarly extend helically within the bore 4.

In the illustrated device, the helical flutes 6 are oriented so that a point moving along the helix toward an observer looking into the bore 4 will appear to that observer to be moving in a clockwise direction, which orientation generally is comparable to that of a left-hand thread but with a very high degree of pitch. Thus, when the device is used in conjunction with a fastener having a right-hand thread, rotation of the device relative to the fastener during loosening thereof will result in the blade edges 10 biting into the metal of the fastener and seating of the device more firmly upon the fastener due to the helical blade edges and the decreasing diameter of the bore 4.

Referring now to FIGURE 4 of the drawings for the method of utilizing the device, therein illustrated is a machine assembly having a base portion 12 and a pedestal upper portion 14 whose flanges are locked in assembly by a plurality of threaded bolts including the unbroken bolt 16 and the bolt 18 having a fractured head. The device is seated coaxially upon the the fractured bolt 18 and a wrench 20 is engaged with the prismatic periphery thereof. As the wrench 20 is turned, some relative rotation between the bolt 18 and block 2 occurs and the blade edges 10 bite into the bolt 18 with the device moving downwardly onto the bolt. Thus, firm engagement between the bolt 18 and block 2 occurs so that further torque applied through the wrench 20 results in rotation of the bolt 18 to effect disengagement.

It can be seen that the curvilinear flutes provide sharp blade edges and concave side faces for the blade edges which are relatively self-cleaning as well as limiting in penetration. This device has been found highly effective in removing bolts with round or fractured heads so long as sufficient length of the bolt is available for gripping by the device. It is also applicable for use with rounded or fractured nuts and also with rotatable members of any coupling or connection. If so desired, the device may also be used to engage securely members of a threaded connection albeit with some defacing of the member gripped by the device.

The flutes can be milled into the surface of the block about the bore quite readily. To obtain the desired characteristics of strength and biting ability, a tool steel should be employed which may be machined and milled in the annealed state and then hardened and tempered. As will be readily appreciated, a set of the devices of the present invention having varying bore diameters can be provided to enable use with a very wide range of fasteners.

Thus, it can be seen that the present invention provides a simple and highly effective device for applying torque to a rotatable member of a connection having a peripheral configuration with which it is difficult to effect firm engagement. The device is relatively economical and simple to manufacture and may be utilized with generally available tools to impart a large gripping and disengaging torque particularly in difficultly accessible locations. The tapered and double-tapered bores permit use of the devices with a range of fastener width and, conveniently, a set of varying bore diameters is provided for use with a very large range of diameters.

Having thus described the invention, I claim:

1. A device for transmitting axial torque to a threaded fastener comprising a block of polygonal transverse section having an axial bore therein tapering inwardly from the end of said block to a reduced diameter, said block having a plurality of helical flutes in the surface thereof about the periphery of said bore, said flutes being of generally curvilinear cross section with substantially equal chords and being closely spaced immediately adjacent each other with arcs of adjacent flutes intersecting to provide helically extending blade portions therebetween having side faces which are concave in section and taper to a relatively sharp blade edge for biting into the metal of a fastener received in said bore, said device being drawn tightly onto the fastener during application of torque thereto.

2. The device of claim 1 wherein there are three to eight flutes having substantially equal chords.

3. The device of claim 1 wherein the axial bore extends through said block, the diameter of said bore at one end thereof being larger than the diameter of said bore at the other end thereof, said bore tapering inwardly from both ends to a section of minimum diameter intermediate said ends.

4. The device of claim 1 wherein there are four to six flutes having substantially equal chords.

5. The device of claim 1 wherein said flutes and helically extending blade portions are so oriented that a point traveling along the blade portion towards an observer will appear to that observer to be moving in a clockwise direction.

6. A device for transmitting counter-clockwise torque to a threaded fastener member to effect removal thereof, comprising a prismatic block of regularly polygonal transverse section, said block having an axial bore extending therethrough adapted to coaxially receive a threaded fastener member in both ends of said block, the diameter of said bore at one end of said block being larger than the diameter at the other end of said block, said bore tapering inwardly from both ends of the block to a section of minimum diameter intermediate said ends; said block having four to six helical flutes in the surface thereof about the periphery of said bore, said flutes being of generally curvilinear cross section with substantially equal chords and being closely spaced immediately adjacent each other with arcs of adjacent flutes intersecting to provide helically extending blade portions therebetween having side faces which are concave in section and taper to a relatively sharp blade edge for biting into the metal of a threaded fastener member received in said bore, the helix defined by each of said flutes and said blade portions being oriented so that a point moving along said helix toward an observer will appear to that observer to be moving in a clockwise direction.

References Cited in the file of this patent

UNITED STATES PATENTS

| | | |
|---|---|---|
| 347,262 | Wood | Aug. 10, 1886 |
| 1,375,456 | Hasty | Apr. 19, 1921 |
| 1,458,076 | Potts | June 5, 1923 |
| 1,590,200 | McGuckin | June 29, 1926 |
| 2,391,624 | Heuer | Dec. 25, 1945 |
| 2,571,968 | Valvano | Oct. 16, 1951 |
| 2,959,995 | Linden | Nov. 15, 1960 |
| 3,020,790 | Wood | Feb. 13, 1962 |